US008072847B2

(12) United States Patent
Sekine et al.

(10) Patent No.: US 8,072,847 B2
(45) Date of Patent: Dec. 6, 2011

(54) OPTICAL DEVICE, OPTICALLY HEAT ASSISTED MAGNETIC RECORDING HEAD AND OPTICALLY HEAT ASSISTED MAGNETIC RECORDING APPARATUS, HAVING INTENSITY POINT DEVIATED FROM AXIS OF THE CORE

(75) Inventors: Koujirou Sekine, Ibaraki (JP); Hiroaki Ueda, Suita (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 429 days.

(21) Appl. No.: 12/406,364

(22) Filed: Mar. 18, 2009

(65) Prior Publication Data
US 2009/0245034 A1 Oct. 1, 2009

(30) Foreign Application Priority Data
Mar. 25, 2008 (JP) ................................. 2008-077617

(51) Int. Cl.
*G11B 11/00* (2006.01)
(52) U.S. Cl. ..................... 369/13.33; 369/13.13; 360/59
(58) Field of Classification Search ............... 369/13.13, 369/13.33, 13.32, 13.02, 112.09, 112.14, 369/112.21, 112.27; 360/59; 385/129, 31, 385/88–94; 250/201.3, 201.5
See application file for complete search history.

(56) References Cited

U.S. PATENT DOCUMENTS

| | | | | |
|---|---|---|---|---|
| 6,795,630 B2 * | 9/2004 | Challener et al. | ............. | 385/129 |
| 6,944,112 B2 | 9/2005 | Challener | ................ | 369/112.27 |
| 7,266,268 B2 * | 9/2007 | Challener et al. | .......... | 369/13.13 |
| 7,580,602 B2 * | 8/2009 | Itagi et al. | ................ | 369/112.27 |
| 7,898,909 B2 * | 3/2011 | Shimazawa et al. | ........ | 369/13.33 |
| 2004/0001420 A1 * | 1/2004 | Challener | .................. | 369/13.13 |
| 2005/0041950 A1 * | 2/2005 | Rottmayer et al. | ........... | 385/147 |
| 2005/0052771 A1 * | 3/2005 | Rausch et al. | ............. | 369/13.13 |
| 2005/0078565 A1 * | 4/2005 | Peng et al. | ................. | 369/13.32 |
| 2005/0289576 A1 * | 12/2005 | Challener | ................ | 369/13.13 |
| 2006/0005216 A1 * | 1/2006 | Rausch | ...................... | 369/13.13 |
| 2008/0002298 A1 * | 1/2008 | Sluzewski | ................. | 360/234.4 |

* cited by examiner

*Primary Examiner* — Tan X Dinh
(74) *Attorney, Agent, or Firm* — Sidley Austin LLP

(57) ABSTRACT

Provided are an optical device, optically assisted magnetic recording head and optically assisted magnetic recording apparatus that effectively emit the introduced light, from the apex portion of a waveguide. The optical device includes: an optical element having a substantially parabolic outline which contains a side surface and the apex portion with a light-emitting surface; a light guiding unit for forming a light spot on the core layer; and a light introducing section provided on the core layer at the position at which the light spot is formed. The light introduced into the core layer travels substantially parallel to the axis of the parabola, and is reflected by the side surface so as to be converged at the focal point of the parabola and is then emitted from the apex portion. The position of the point where the light intensity is greatest in the light spot is deviated from the axis.

27 Claims, 7 Drawing Sheets

OPTICAL DEVICE, OPTICALLY HEAT ASSISTED MAGNETIC RECORDING HEAD AND OPTICALLY HEAT ASSISTED MAGNETIC RECORDING APPARATUS, HAVING INTENSITY POINT DEVIATED FROM AXIS OF THE CORE

This application is based on Japanese Patent Application No. 2008-077617 filed on Mar. 25, 2008, in Japanese Patent Office, the entire content of which is hereby incorporated by reference.

TECHNICAL FIELD

The present invention relates to an optical device, an optically assisted magnetic recording head and, an optically assisted magnetic recording apparatus.

BACKGROUND

In the magnetic recording method, the magnetic bit with higher recording density is more affected by the ambient temperature and such. To address this problem, a recording medium having greater coercive force is required. Use of such a recording medium requires a greater magnetic field for recording. The upper limit of the magnetic field produced by the recording head depends on the saturation flux density, and the value of the saturation flux density is so close to the limit of the material that a drastic increase cannot be expected. To solve this problem proposed is the following method: Causing magnetic weakening by local heating for recording, recording while the coercive force is reduced, and stopping the heating to facilitate natural cooling, whereby the recorded magnetic bit is stabilized. This is referred to as a thermally assisted magnetic recording method.

In the thermally assisted magnetic recording method, a recording medium is preferably heated instantaneously, and the heating mechanism must not to be contacted to the recording medium. Therefore, heating is generally performed by absorption of light. The method of using light for heating is called the optically assisted method. A minute light spot having a size smaller than a wavelength of the used light is required when the optically assisted method is used for high-density recording.

Therefore, utilized is an optical head that employs the near-field light produced at an optical opening having a size smaller than the wavelength of the incident light (Specification of U.S. Pat. No. 6,944,112).

The optical recording head disclosed in the Specification of the U.S. Pat. No. 6,944,112 includes a writing magnetic pole, and a plane waveguide containing a core layer and a clad layer adjacent to the writing magnetic pole. The core layer is provided with at least one parabolic edge that reflects an electromagnetic wave inside the core layer and leads it to the focal point. The apex portion, where the focal point of the parabola is located, has a flat surface shape similar to the shape made by cutting off a tip of a parabola. This apex portion is provided close to the air bearing surface (ABS), where the recording head is opposed to a recording medium.

The core layer is provided with a diffraction grating that leads light into the core layer. For example, when the diffraction grating is radiated with a laser beam, the laser beam is introduced into the core layer and converged at the focal point located on the apex portion. The recording medium is radiated with the light emitted from the apex portion and thereby heated.

Although in the optical recording head disclosed in the Specification of the U.S. Pat. No. 6,944,112, the laser beam applied to the diffraction grating is led into the core layer of a plane waveguide and is guided toward the apex portion, the light directly coming to the plane surface having a shape formed by cutting off the tip of the parabola does not converge at the focal point. Thus, there is a problem that the laser beam having a Gaussian distribution of intensity of the light applied to the diffraction grating does not effectively converge at the focal point in some cases, and light cannot be effectively emitted from the apex portion of the core.

In view of the prior art problems described above, it is an object of the present invention to provide an optical device where the light applied to a light introducing section can be efficiently emitted from the apex portion of a core layer, an optical recording head containing this optical device, and an optical recording apparatus including this optical recording head.

SUMMARY

In view of forgoing, one embodiment according to one aspect of the present invention is an optical device, comprising:
  an optical element having a core; the core including:
    a side surface defining a substantially parabolic outline of the core; and
    an apex portion having a light emitting surface which is defined by two opening ends and through which light is to be emitted,
    wherein light having been introduced into the core and having reached the side surface is reflected by the side surface and converged at a focal point of the parabola before being emitted through the light emitting surface,
  a light guiding unit which is adapted to irradiate the core with light from a light source to make a light spot thereon; and
  a light introducing portion which is provided at a position on the core at which the light spot is to be formed by the light guiding unit, and is adapted to introduce into the core the light forming the light spot, wherein the light introduced into the core by the light introducing portion travels substantially parallel to an axis of the parabola which passes through the focal point of the parabola and is perpendicular to a directrix of the parabola,
  wherein a maximum intensity point at which light intensity is maximum within the light spot formed by the light guiding unit on the core is deviated from the axis of the parabola.

According to another aspect of the present invention, another embodiment is an optically assisted magnetic recording head, comprising:
  a magnetic recording section which is adapted to conduct magnetic recording in a magnetic recording medium; and
  an optical device provided close to the magnetic recording section, the optical device including:
    an optical element having a core; the core having:
      a side surface defining a substantially parabolic outline of the core;
      an apex portion having a light emitting surface which is defined by two opening ends and through which light is to be emitted,
    wherein light having been introduced into the core and having reached the side surface is reflected by the side surface and converged at a focal point of the parabola before being emitted through the light emitting surface,
    a light guiding unit which is adapted to irradiate the core with light from a light source to make a light spot thereon; and a light introducing portion which is provided at a position on the core at which the light spot is to be formed by the light guiding unit, and is adapted to introduce into the core the light forming the light spot, wherein the light introduced into the core by the light introducing portion travels substantially parallel to an axis of the parabola which passes through the focal point of the parabola and is perpendicular to a directrix of the parabola, wherein a maximum intensity point at which light intensity is maximum within the light spot formed by the light guiding unit on the core is deviated from the axis of the parabola.

According to another aspect of the present invention, another embodiment is an optically assisted magnetic recording apparatus, comprising:

a magnetic recording medium;

a magnetic recording section which is adapted to conduct magnetic recording in a magnetic recording medium;

an optical device provided close to the magnetic recording section, the optical device including:

an optical element having a core; the core having:

a side surface defining a substantial parabola outline of the core;

an apex portion having a light emitting surface which is defined by two opening ends and through which light is to be emitted, wherein light having been introduced into the core and having reached the side surface is reflected by the side surface and converged at a focal point of the parabola before being emitted through the light emitting surface, a light guiding unit which is adapted to irradiate the core with light from a light source to make a light spot thereon; and a light introducing portion which is provided at a position on the core at which the light spot is to be formed by the light guiding unit, and is adapted to introduce into the core the light forming the light spot, wherein the light introduced into the core by the light introducing portion travels substantially parallel to an axis of the parabola which passes through the focal point of the parabola and is perpendicular to a directrix of the parabola, wherein a maximum intensity point at which light intensity is maximum within the light spot formed by the light guiding unit on the core is deviated from the axis of the parabola, a drive mechanism which is adapted to move the magnetic recording section and the optical device relative to the magnetic recording medium.

DETAILED DESCRIPTION OF THE PREFERRED EMBODIMENT

Figure 1:
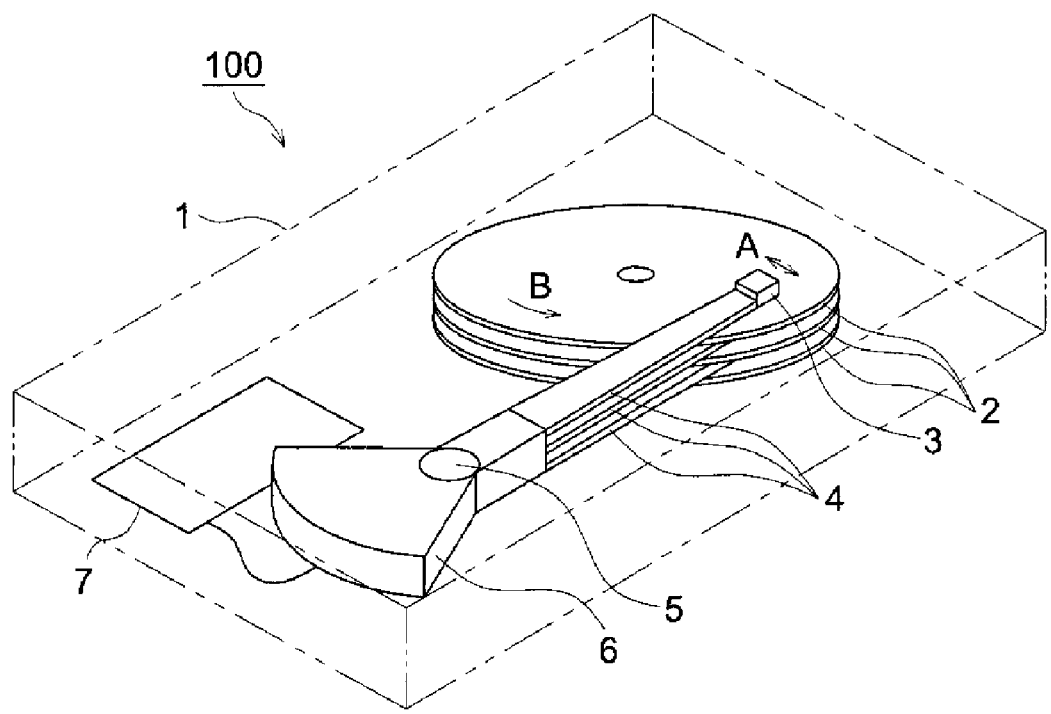
FIG. 1 is a diagram showing an example of the schematic configuration of an optical recording apparatus equipped with an optically assisted magnetic recording head of an embodiment of the present invention.

The present invention relates to an optical device capable of generating a small light spot. This device can be used, for example, in an optical recording head for recording on an optical magnetic recording medium or an optical recording medium.

Referring to the drawings, the following describes an optically assisted magnetic recording head made up of an optical recording head and a magnetic recording section of an embodiment of the present invention, and an optical recording apparatus containing the optically assisted magnetic recording head, without the present invention being restricted thereto. The same and equivalent portions in the embodiments will be assigned with the same reference numerals and will not be described to avoid duplication.

FIG. 1 shows an example of the schematic configuration of an optical recording apparatus (e.g., hard disk apparatus) equipped with an optically assisted magnetic recording head of an embodiment of the present invention. An optical recording apparatus 100 has the following components (1) through (6) incorporated in an enclosure 1:

(1) recording disks (recording medium) 2, (2) suspensions 4 mounted rotatably in the direction of arrow A (tracking direction) on a spindle 5 as a fulcrum, (3) a tracking actuator 6 mounted on the suspensions 4, (4) an optically assisted magnetic recording head (hereinafter referred to as "optical recording head 3") mounted on the apex portion of the suspension 4, (5) a motor (not illustrated) for rotating a disk 2 in the direction of arrow B, and (6) a control section 7 for executing control of the tracking actuator 6, the motor, and an optical recording head 3 for generation of light to be emitted for recording in response to the recording information on the disk 2 and generation of magnetic field.

This optical recording apparatus 100 is designed so that the optical recording head 3 is allowed to levitate above and move relative to the disk 2.

Figure 2:
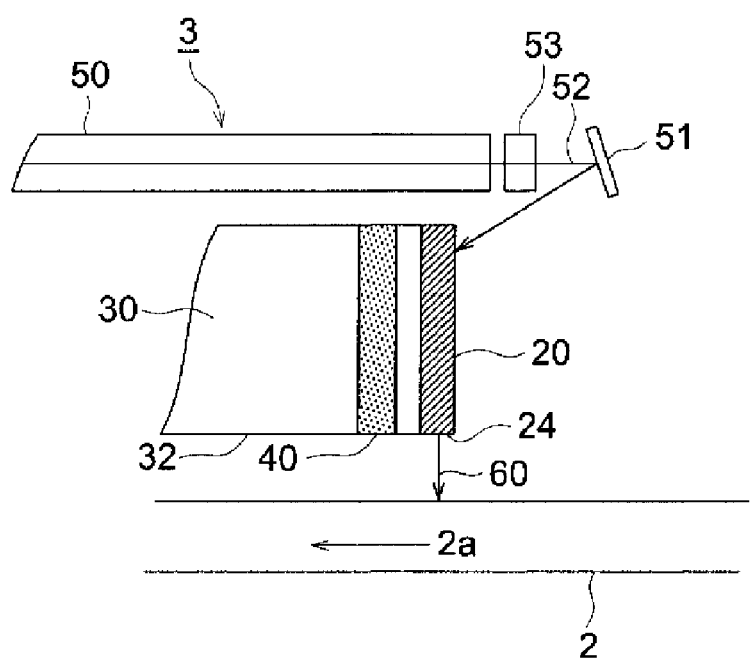
FIG. 2 is diagram showing the cross sectional view of an example of an optical recording head of an embodiment of the present invention.

FIG. 2 schematically shows the cross section of the portion, of an example of the optical recording head, related to recording and writing. The optical recording head 3 uses light to record information on the disk 2, and includes a slider 30, optical element 20, magnetic recording section 40, optical fiber 50 as a light guiding unit, external optical system 53 and mirror 51.

The slider 30 performs a relative movement while levitating above the disk 2 as a magnetic recording medium, and therefore the surface, of the slider 30, opposed to the disk 2 is provided with an ABS surface 32 (air bearing surface) for improving levitation performance.

For example, assume that a semiconductor laser is used as a light source (not illustrated). The light emitted from a semiconductor laser is led to the vicinity of the optical element 20 by the optical fiber 50. The light coming from the optical fiber 50 enters the external optical system 53, and is emitted to be a collimated light 52, which is reflected by a mirror 51 and is projected on the optical element 20. As will be described later, the optical element 20 includes a diffraction grating as a light introducing section, a waveguide made of a core layer for guiding the introduced light to emit it, and a clad layer. The light reflected by the mirror 51 is introduced into the waveguide—to put it more specifically, into a core layer—through the diffraction grating. The light coming to the core layer goes to an apex portion 24 of the core layer and is emitted to the disk 2 as radiated light 60 for heating.

When the radiated light 60 with the shape of a minute light spot is projected to the disk 2, there is a temporary rise in the temperature on the irradiated portion of the disk 2 and thereby causing a reduction in the coercive force of the disk 2. On the portion where the light is projected and the coercive force is reduced, magnetic information is written by the magnetic recording section 40.

In FIG. 2, an optical element 20 and magnetic recording section 40 are arranged, in the recording area of the disk 2, in this order from the incoming side to the outgoing side (in the direction of arrow 2a in the drawing). As described above, when the magnetic recording section 40 is positioned immediately after the outgoing side of the optical element 20, writing is preferably performed before the heated recording area is cooled excessively. It is also possible to provide a magnetic information reproduction section (not illustrated) that reads the magnetically recorded information written on the disk 2, on the outgoing side of the magnetic recording section 40 or on the incoming side of the optical element 20.

Figure 3:
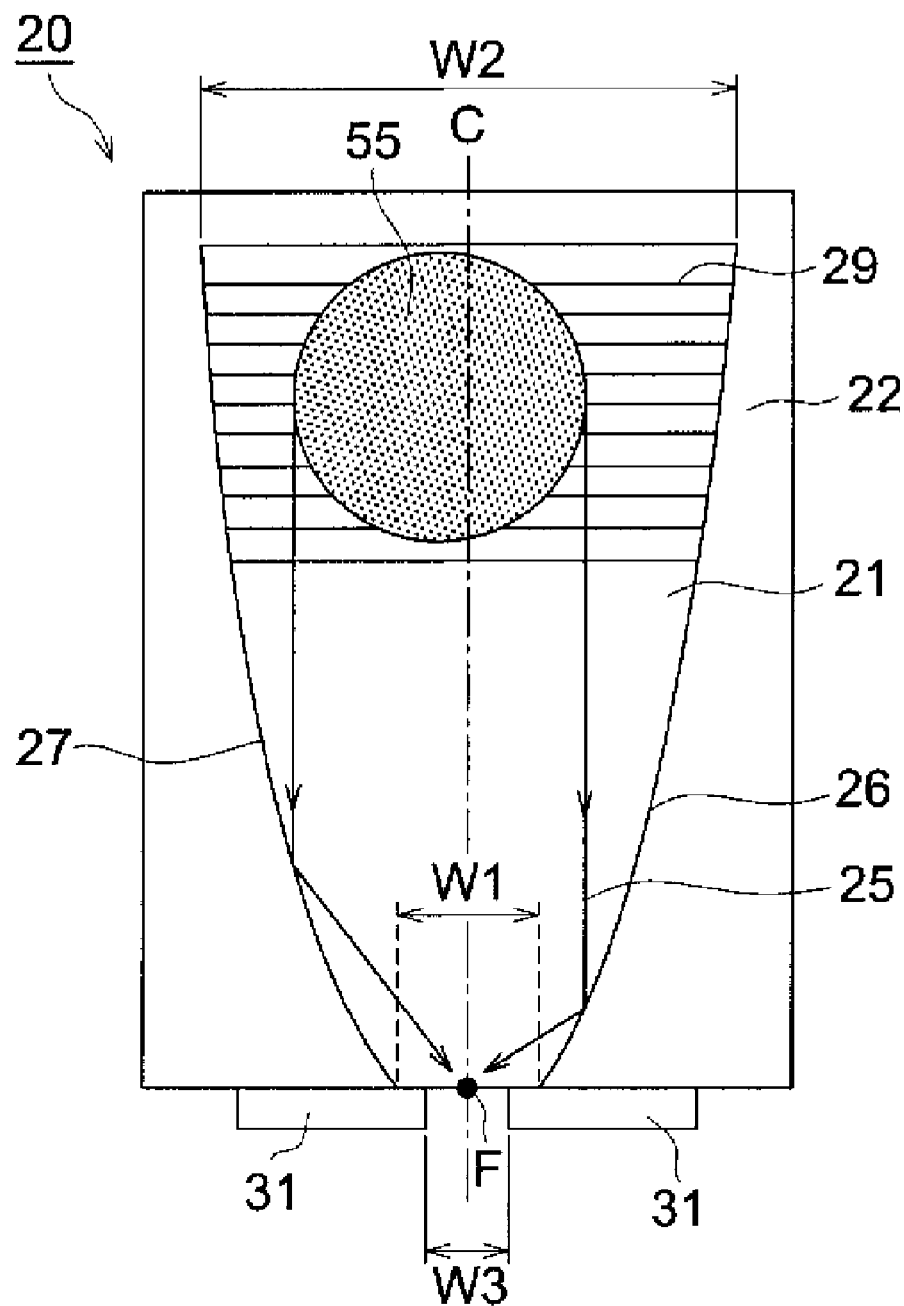
FIG. 3 is a diagram schematically showing the front view of a waveguide of an embodiment of the present invention.
Figure 4:
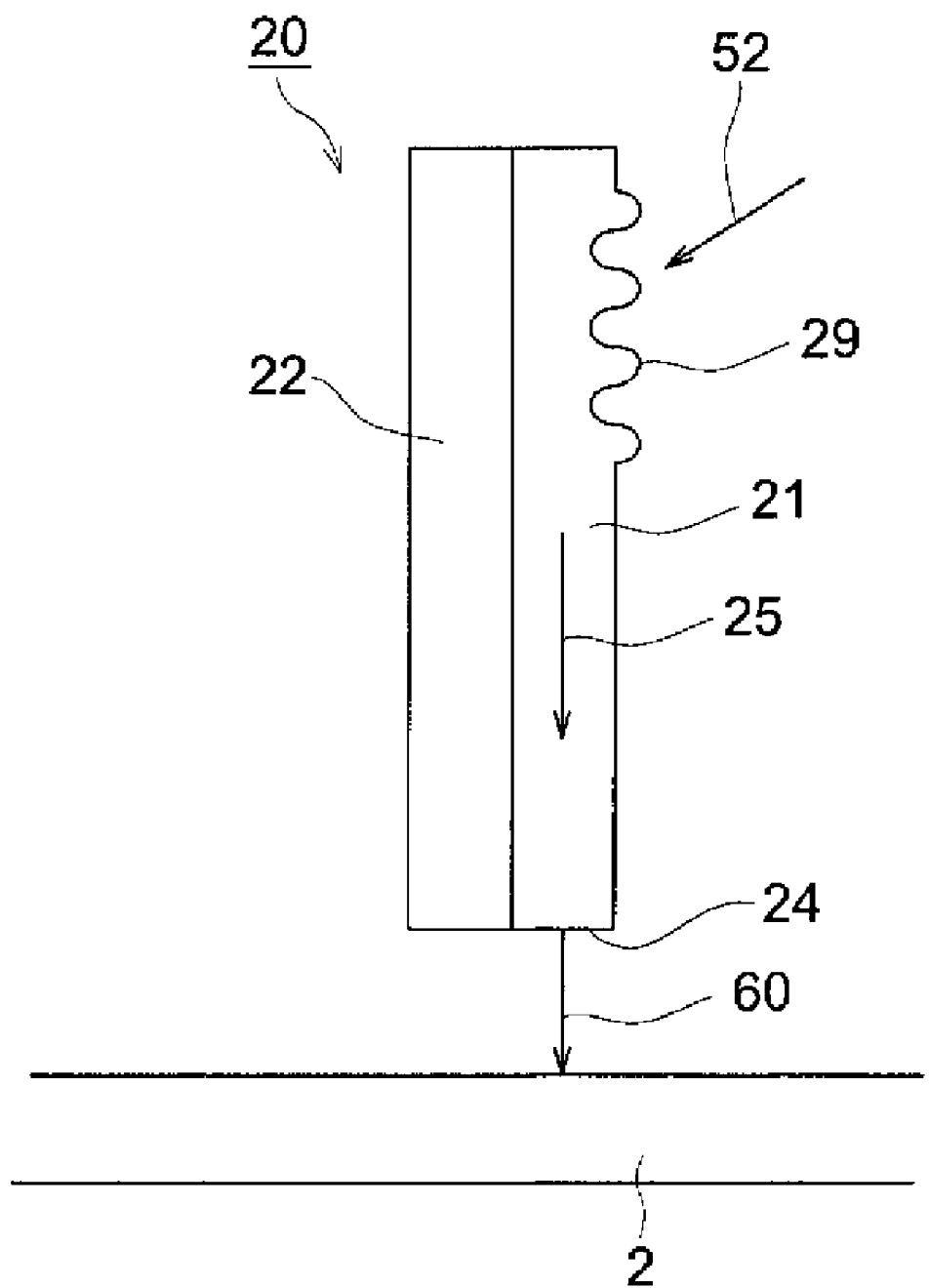
FIG. 4 is a diagram schematically showing the side view of the waveguide of an embodiment of the present invention.

The following describes the optical element 20. The front view of the optical element 20 is schematically shown in FIG. 3, and the side view is also schematically illustrated in FIG. 4. The optical element 20 includes a core layer 21 and clad layer 22 both constituting the waveguide. A diffraction grating 29 as a light introducing section is formed in the surface of the core layer 21. The waveguide can be formed in multiple layers made up of materials of different refractive indexes. The refractive index of the core layer 21 is greater than that of the clad layer 22. The waveguide is constituted due to the difference in refractive indexes, and the light in the core layer 21 is contained inside the core layer 21, and is efficiently led in the direction indicated by the arrow 25 to the apex portion 24.

It is preferred that the refractive index of the core layer 21 should be approximately in the range of 1.9 through 4.0, and that of the clad layer 22 should be approximately in the range of 1.0 through 2.0, without being restricted to these ranges. The core layer 21 of higher refractive index than that of the clad layer 22 enables internal reflection to guide the light more efficiently. The core layer 21 contains a greater amount of light inside the core layer 21 as the ratio of the refractive index of the core layer 21 to the refractive index of the clad layer 22 is greater. The opposite side (right side in FIG. 4) of the core layer 21 in contact with the clad layer 22 is kept in contact with air that serves as a clad layer.

The core layer 21 is made of $Ta_2O_5$, $TiO_2$ and ZnSe, and preferably has a thickness of about 20 nm through 500 nm, without being restricted thereto. The clad layer 22 is formed of $SiO_2$, air, $Al_2O_3$ or others, and preferably has a thickness of about 200 nm through 2000 nm, without being restricted thereto.

The core layer 21 includes side surfaces 26 and 27 formed so as to constitute a parabolic outline of the core layer so as to reflect the introduced light toward the focal point F of the parabolic outline. In FIG. 3, the axis C (a line perpendicular to the directrix (not illustrated) of the parabola and passing through the focal point F) denotes the center axis of bilateral symmetry of the parabola of the outline, and the focal point F indicates the focal point of the parabola. Although the outline defined by the side surfaces 26 and 27 can be formed in a strict parabola as shown in FIG. 3, it can be formed in a shape similar to a parabola as far as it allows light to converge at the focal point F. It is also possible to arrange such a configuration that the side surfaces 26 and 27 are provided with reflective substances such as gold, silver or aluminum to ensure that possible loss by light reflection is minimized.

The apex portion 24 of the core layer 21 of the waveguide is located adjacent to the disk 2 and has a flat surface whose shape is similar to the shape formed by cutting off the tip portions of the parabolic side surfaces 26 and 27. The apex portion 24 preferably has a width W1 ranging from about 1 μm through 10 μm, without its width being restricted thereto. For example, the width W1 can be changed depending on the shape of the side surfaces 26 and 27, or can be decreased so as to increase the ratio of the incoming width W2 as an opening width of the parabola to the emitting width W1 in order to increase the level of convergence of the light emitted through the apex portion 24. Because the thickness of the core 21 is very thin comparing to other dimensions of the core 21, the side surfaces 26 and 27 substantially form the outline of the core 21. In this embodiment, the apex portion 24 has a flat surface. However, the surface that the apex portion 24 has does not need to be flat.

Because the light emitted from the focal point F diverges sharply, when the apex portion 24 is formed to have a plane surface, the focal point F can preferably be arranged closer to the disk 2, and the converged light can preferably be applied to the disk 2 before the light is much diverged. Further, a focal point F can be formed on the apex portion 24, or outside the apex portion 24.

As shown in FIG. 3, the apex portion 24 can be provided with a metal film 31 for defining the opening. When the opening width W3 defined by metal film 31 is made smaller than the width W1 of the apex portion 24, it is possible to reduce the diameter of the light spot formed by applying light to the disk 2 from the optical element 20. The width W3 can be set in range from about 10 nm through 500 nm. The metal film 31 can be made of aluminum, gold or silver and such.

The diffraction grating 29 is made of a plurality of grooves parallel to the directrix of the parabola which represents the shape of the side surfaces 26 and 27 of the core layer 21. This diffraction grating 29 is irradiated with the light emitted from the optical fiber 50 at a predetermined angle of incidence (in particular, the angle in a plane including the axis C of the parabola and perpendicular to the core layer 21) after the light emitted from the optical fiber 50 is converted into a collimated light 52 by using, for example, the external optical system 53 made up of a spherical lens and such. The light projected on the diffraction grating 29 is illustrated as a light spot 55. The light spot 55 is introduced into the core layer 21 through the diffraction grating 29. As a method for introducing the collimated light into the core layer 21 can be such a method that uses an optical element called prism coupler that employs a prism instead of a diffraction grating, in addition to the method using the above-mentioned grating coupler having a diffraction grating, however, the present invention is not restricted thereto. It should be noted that, if the diffraction grating 29 is formed in a shape with which the non-parallel light can be changed into the parallel light, the light applied to the diffraction grating 29 does not need to be a collimated light.

The collimated light applied to the diffraction grating 29 at the predetermined angle of incident is introduced into the core layer 21, and travels substantially parallel (as shown in FIG. 3, when viewed from the direction perpendicular to the paper) to the axis C of the parabola which is the shape of the side surfaces 26 and 27.

Figure 5:
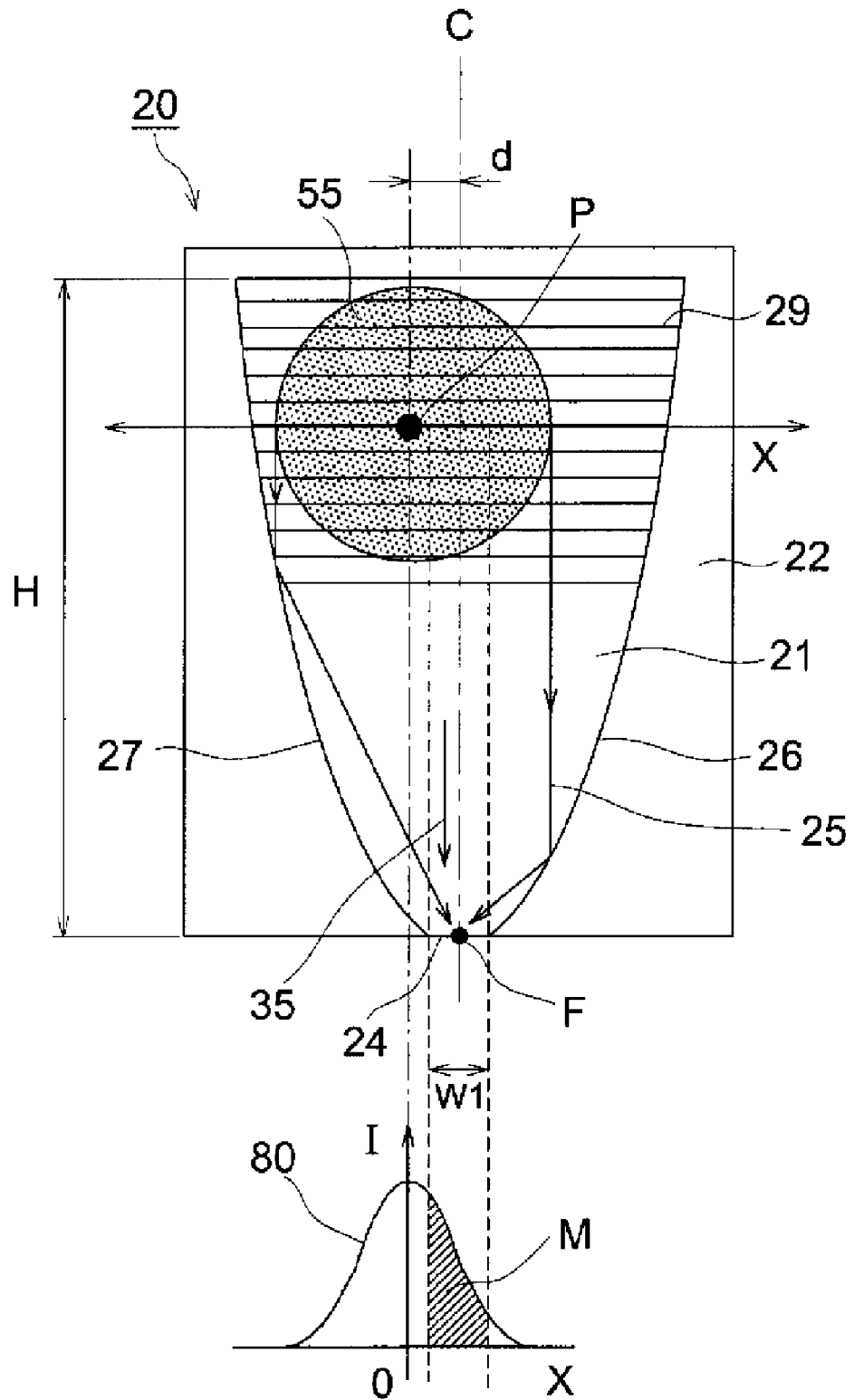
FIG. 5 is a diagram representing the state of light condensation when the center, of the light spot, having the greatest light intensity is displaced with respect to the axis of a parabola of a waveguide of an embodiment of the present invention.

The intensity of light applied to the diffraction grating 29 commonly exhibits a Gaussian distribution which is symmetric in the direction of the diameter. FIG. 5 shows the situation that the diffraction grating 29 is irradiated with the light spot 55 with a Gaussian distribution of light intensity. In FIG. 5, the intensity distribution, of the light spot 55 applied to the diffraction grating 29, centered at the position P is given as a light intensity distribution 80. The horizontal axis x denotes the position along the diameter, where the origin O indicates the center of the light spot (position P), and the vertical axis I indicates the intensity of light. To be more specific, the position P indicates the position where the light intensity is maximum in the light spot 55. The light applied to the diffraction grating 29 is introduced into the core layer 21 to travel through the core layer 21. Of the light traveling in the core layer 21, the light that reaches the side surfaces 26 and 27 is converged at the focal point F, and the light directly entering, instead of heading to the side surfaces 26 and 27, the opening with the width W1 at the apex portion 24 (e.g., light indicated by arrow 35 in FIG. 5) is not converged at the focal point F. The light directly entering the opening of the width W1 is indicated by the hatched area M in the light intensity distribution 80 in FIG. 5. The light flux directly entering the opening of the width W1 makes little contribution to the formation of the light spot formed by the optical element 20 at the focal point F, whereby light efficiency is reduced.

Figure 6:
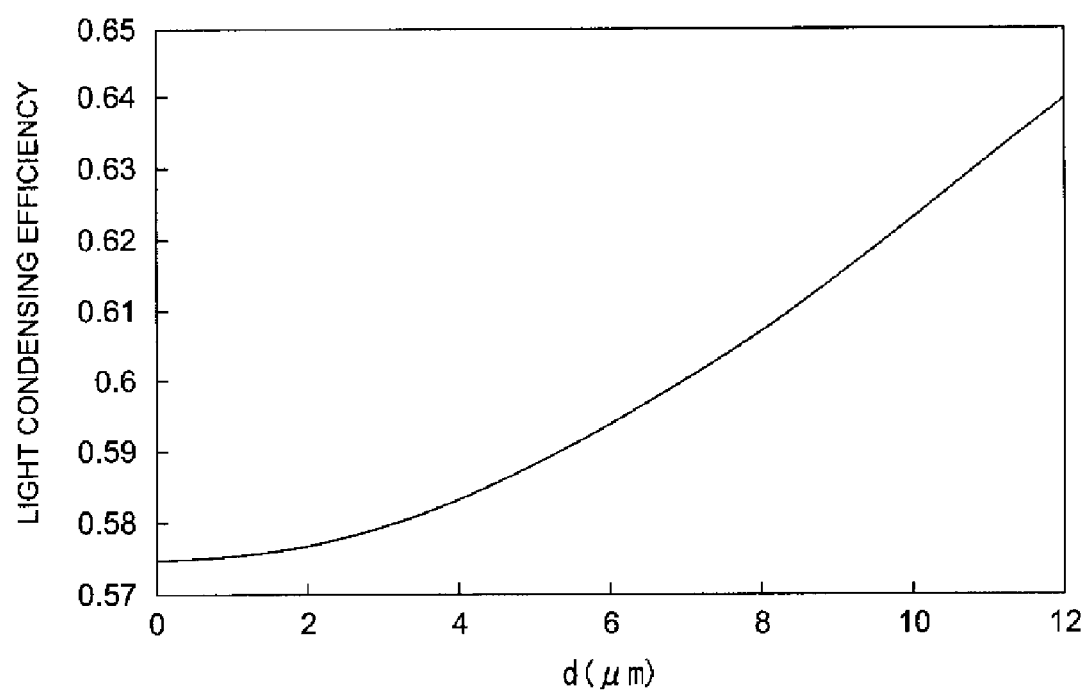
FIG. 6 is a diagram representing the result of simulating light condensing efficiency when the center, of the light spot, having the greatest light intensity is displaced with respect to the axis of a parabola of a waveguide of an embodiment of the present invention.

FIG. 6 shows the result of simulating the light condensing efficiency at the focal point F by changing the distance "d", where the distance "d" indicates the distance from the axis C of the parabola formed by the side surfaces 26 and 27 to the position P where the light intensity of the light spot 55 projected on the diffraction grating 29 is maximum.

The following shows the conditions for the simulation:
(1) Formula for defining the parabola which is the shape of the side surfaces 26 and 27:

$$y = x^2/6$$

(2) Width W1 of the opening: 6 μm
(3) Length H of the parabola along the axis C: 100 μm
(4) Diameter of the light spot $(1/e^2)$:
30 μm As illustrated in FIG. 6, it is seen that, when distance d=0 and the position P is located on the axis C of the parabola, the light condensing efficiency is lowest, and light condensing efficiency is improved as the position P is gradually deviated from the axis C. In FIG. 5, the relationship between the distance "d" and light condensing efficiency is bilaterally symmetrical, where the distance "d" is a distance from the axis C to the position P. Therefore, FIG. 6 shows only the positive side of d=0. When the distance d=0, the light condensing efficiency is lowest. This is because, out of the light flux, centered on the position P, of the light spot 55, the light flux corresponding to the width W1 is not converged at the focal point F, where the light intensity of the light spot 55 having a Gaussian distribution of light intensity is maximum at the position P. Thus, the light condensing efficiency can be improved when the position P of the center, where the light intensity of the light spot 55 is maximum, is deviated from the axis C of the parabola. It should be noted that the light condensing efficiency is not improved infinitely as the position P of the light spot 55 is deviated from the axis. It goes without saying that the light condensing efficiency has a maximum value at some position, instead of improving infinitely, depending on the width of the parabola, which is symmetric about the axis C, measured at the position where the diffracting grating 29 is formed and the diameter of the light spot 55, and when the position P is further deviated, the light condensing efficiency starts decreasing.

Figure 7:
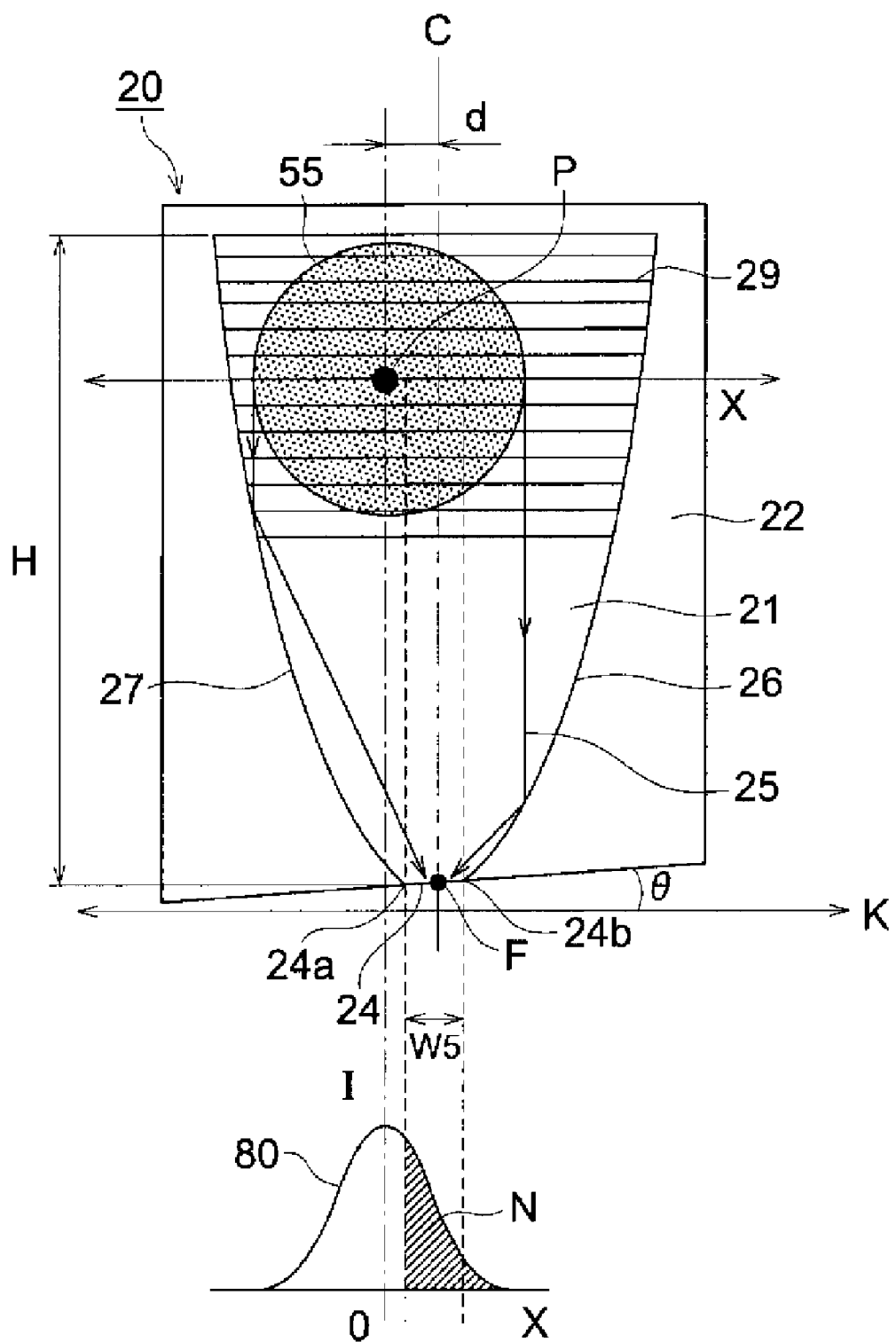
FIG. 7 is a diagram showing the state of light condensation, in a waveguide of an embodiment of the present invention, when the center, of the light spot, having the greatest light intensity is displaced with respect to the axis of a parabola and the apex portion is tilted.
Figure 8:
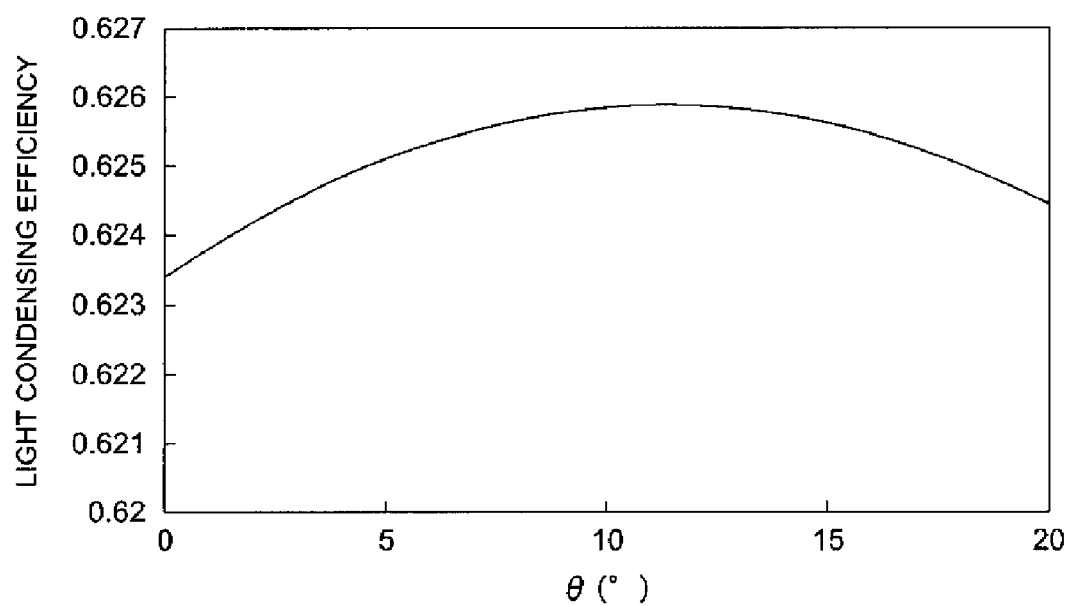
FIG. 8 is a diagram representing the result of simulating light condensing efficiency, in a waveguide as an embodiment of the present invention, when the center, of the light spot, having the greatest light intensity is displaced with respect to the axis of a parabola and the apex portion is tilted.

As shown in FIG. 7, the flat surface of the apex portion 24 is preferably tilted. FIG. 8 shows the result of simulation of the light condensing efficiency at the focal point F supposing the focal point F located on the flat surface of the apex portion 24, where the flat surface is tilted about the axis which is perpendicular to the axis C of the parabola and is perpendicular to the sheet surface passing through the focal point F. The conditions for the simulation were the same as the aforementioned conditions (1) through (4) and the distance "d" of 10 μm. The inclination θ with respect to directrix K was changed.

The example of this simulation suggests that the light condensing efficiency is maximum when the inclination angle θ is approximately 11°, as shown in FIG. 8. The reason why the light condensing efficiency varies as the inclination angle θ varies is that when the apex portion 24 is tilted, the width W5 of the opening changes in such a way that one end 24a of the opening of the apex portion 24 comes closer to the focal point F and the other end 24b further gets away from the focal point F, whereby the amount of the light flux (hatched area N in FIG. 7) traveling toward the opening of the width W5 changes. In the case of this arrangement, the light condensing efficiency is maximized at some angle when the apex portion 24 is tilted with respect to the axis C in such a way that the end 24a on the first side of the two sides of the core layer 21 divided by the axis C is closer to the focal point F than the other end 24b of the apex portion 24, where the position P at the center of the light spot 55 is located on the first side of the core layer 21.

As described above, the light condensing efficiency at the focal point F is enhanced by appropriately arranging the position, to be more specific the position where the light intensity is maximum, of the light spot to be applied to the diffraction grating 29, and properly setting the inclination of the flat surface of the apex portion 24 of the core layer 21. This arrangement provides an optical recording head 3 that ensures the light with higher light condensing efficiency to be emitted from the apex portion 24.

The optical recording head described above is an optically assisted magnetic recording head that uses magnetism to record information on a disk 2. It is also possible to produce an optical recording head that uses light to record information on a recording medium without having a magnetic recording section, for example, the optical recording head for recording by nearby-field light or recording by phase change.

According to the optical device of the present embodiment, the light applied to the light introducing section can be emitted efficiently from the apex portion of the core layer. Further, the optical recording head and optical recording apparatus of the present embodiment are equipped with an optical device that ensures the light have been applied to the light introducing section to be emitted efficiently from the apex portion of the core layer.

What is claimed is:
1. An optical device, comprising:

an optical element having a core; the core including:
  a side surface defining a substantially parabolic outline of the core; and
  an apex portion having a light emitting surface which is defined by two opening ends and through which light is to be emitted,
  wherein light having been introduced into the core and having reached the side surface is reflected by the side surface and converged at a focal point of the parabola before being emitted through the light emitting surface,
a light guiding unit which is adapted to irradiate the core with light from a light source to make a light spot thereon; and
a light introducing portion which is provided at a position on the core at which the light spot is to be formed by the light guiding unit, and is adapted to introduce into the core the light forming the light spot, wherein the light introduced into the core by the light introducing portion travels substantially parallel to an axis of the parabola which passes through the focal point of the parabola and is perpendicular to a directrix of the parabola,
wherein a maximum intensity point at which light intensity is maximum within the light spot formed by the light guiding unit on the core is deviated from the axis of the parabola.

2. The optical device of claim 1, wherein the light emitting surface of the apex portion of the core is inclined with respect to the directrix of the parabola.

3. The optical device of claim 2, wherein the core is divided into two sides by the axis of the parabola, and the light emitting surface of the apex portion of the core is inclined so that one of the two opening ends which is located on the same side on which the maximum intensity point of the light spot is located gets to be closer to the focal point of the parabola.

4. The optical device of claim 1, wherein the light introducing portion includes a diffraction grating formed at a surface of the core.

5. The optical device of claim 4, wherein the diffraction grating is configured of a plurality of grooves formed in the core to be parallel to the directrix of the parabolic.

6. The optical device of claim 1, comprising:
a clad layer,
  wherein the core is formed in a laminar shape on the clad layer.

7. The optical device of claim 1, wherein the light introducing unit irradiates the core with a collimated light.

8. The optical device of claim 7, wherein the light guiding unit includes:
  a converting optical system which is adapted to convert the light from the light source into the collimated light; and
  a light reflection surface which is adapted to reflect the collimated light from the converting optical system toward the light introducing portion.

9. The optical device of claim 1, wherein the optical element includes:
  a metal film which is adapted to define the light emitting surface of the apex portion of the core.

10. An optically assisted magnetic recording head, comprising:
  a magnetic recording section which is adapted to conduct magnetic recording in a magnetic recording medium; and
  an optical device provided close to the magnetic recording section, the optical device including:
    an optical element having a core; the core having:
      a side surface defining a substantially parabolic outline of the core;
      an apex portion having a light emitting surface which is defined by two opening ends and through which light is to be emitted,
      wherein light having been introduced into the core and having reached the side surface is reflected by the side surface and converged at a focal point of the parabola before being emitted through the light emitting surface,
    a light guiding unit which is adapted to irradiate the core with light from a light source to make a light spot thereon; and
    a light introducing portion which is provided at a position on the core at which the light spot is to be formed by the light guiding unit, and is adapted to introduce into the core the light forming the light spot, wherein the light introduced into the core by the light introducing portion travels substantially parallel to an axis of the parabola which passes through the focal point of the parabola and is perpendicular to a directrix of the parabola,
    wherein a maximum intensity point at which light intensity is maximum within the light spot formed by the light guiding unit on the core is deviated from the axis of the parabola.

11. The optically assisted magnetic recording head of claim 10, wherein the light emitting surface of the apex portion of the core is inclined with respect to the directrix of the parabola.

12. The optically assisted magnetic recording head of claim 11, wherein the core is divided by the axis of the parabola into two sides, and the light emitting surface of the apex portion of the core is inclined so that one of the two opening ends which is located on the same side on which the maximum intensity point of the light spot is located gets to be closer to the focal point of the parabola.

13. The optically assisted magnetic recording head of claim 10, wherein the light introducing portion includes a diffraction grating formed at a surface of the core.

14. The optically assisted magnetic recording head of claim 13, wherein the diffraction grating is configured of a plurality of grooves formed in the core to be parallel to the directrix of the parabolic.

15. The optically assisted magnetic recording head of claim 10, wherein the optical device includes:
  a clad layer,
  wherein the core is formed in a laminar shape on the clad layer.

16. The optically assisted magnetic recording head of claim 10, wherein the light introducing unit irradiates the core with a collimated light.

17. The optically assisted magnetic recording head of claim 16, wherein the light guiding unit includes:
  a converting optical system which is adapted to convert the light from the light source into the collimated light; and
  a light reflection surface which is adapted to reflect the collimated light from the converting optical system toward the light introducing portion.

18. The optically assisted magnetic recording head of claim 10, wherein the optical element includes:
  a metal film which is adapted to define the light emitting surface of the apex portion of the core.

19. An optically assisted magnetic recording apparatus, comprising:
  a magnetic recording medium;

a magnetic recording section which is adapted to conduct magnetic recording in a magnetic recording medium;

an optical device provided close to the magnetic recording section, the optical device including:

an optical element having a core; the core having:

a side surface defining a substantial parabola outline of the core;

an apex portion having a light emitting surface which is defined by two opening ends and through which light is to be emitted, wherein light having been introduced into the core and having reached the side surface is reflected by the side surface and converged at a focal point of the parabola before being emitted through the light emitting surface, a light guiding unit which is adapted to irradiate the core with light from a light source to make a light spot thereon; and a light introducing portion which is provided at a position on the core at which the light spot is to be formed by the light guiding unit, and is adapted to introduce into the core the light forming the light spot, wherein the light introduced into the core by the light introducing portion travels substantially parallel to an axis of the parabola which passes through the focal point of the parabola and is perpendicular to a directrix of the parabola, wherein a maximum intensity point at which light intensity is maximum within the light spot formed by the light guiding unit on the core is deviated from the axis of the parabola, a drive mechanism which is adapted to move the magnetic recording section and the optical device relative to the magnetic recording medium.

20. The optically assisted magnetic recording apparatus of claim 19, wherein the light emitting surface of the apex portion of the core is inclined with respect to the directrix of the parabola.

21. The optically assisted magnetic recording apparatus of claim 20, wherein the core is divided into two sides by the axis of the parabola, and the light emitting surface of the apex portion of the core is inclined so that one of the opening ends which is located on the same side on which the maximum intensity point of the light spot is located gets to be closer to the focal point of the parabola.

22. The optically assisted magnetic recording apparatus of claim 19, wherein the light introducing portion includes a diffraction grating formed at a surface of the core.

23. The optically assisted magnetic recording apparatus of claim 22, wherein the diffraction grating is configured of a plurality of grooves formed in the core to be parallel to the directrix of the parabolic.

24. The optically assisted magnetic recording apparatus of claim 19, wherein the optical device includes:

a clad layer, wherein the core is formed in a laminar shape on the clad layer.

25. The optically assisted magnetic recording apparatus of claim 19, wherein the light introducing unit irradiates the core with a collimated light.

26. The optically assisted magnetic recording apparatus of claim 25, wherein the light guiding unit includes:

a converting optical system which is adapted to convert the light from the light source into the collimated light; and a light reflection surface which is adapted to reflect the collimated light from the converting optical system toward the light introducing portion.

27. The optically assisted magnetic recording apparatus of claim 19, wherein the optical element includes:

a metal film which is adapted to define the light emitting surface of the apex portion of the core.

* * * * *